Aug. 27, 1968  R. R. THIEBEN  3,399,294
HEATED INSULATED GLASS WINDOW STRUCTURE
Filed Jan. 24, 1966  2 Sheets-Sheet 1
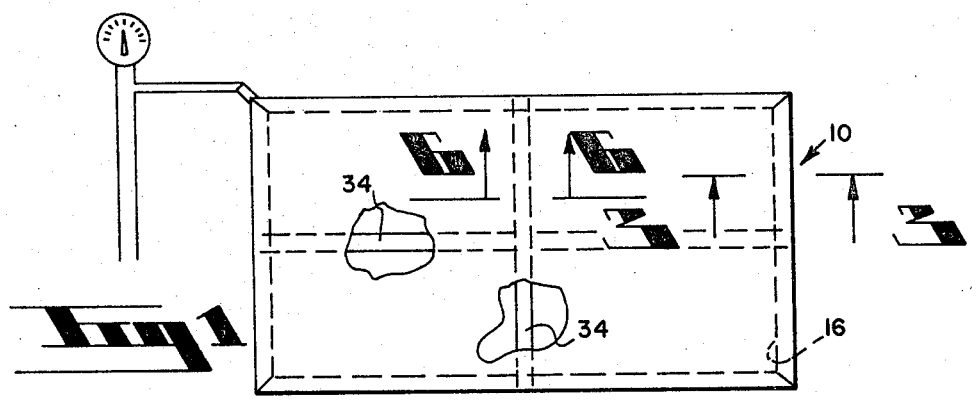
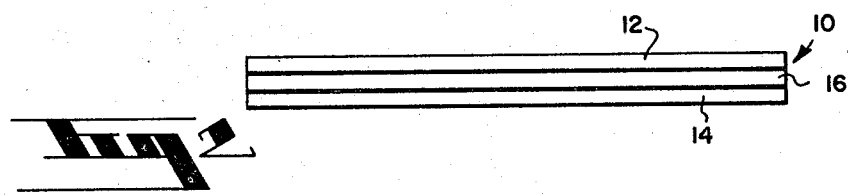
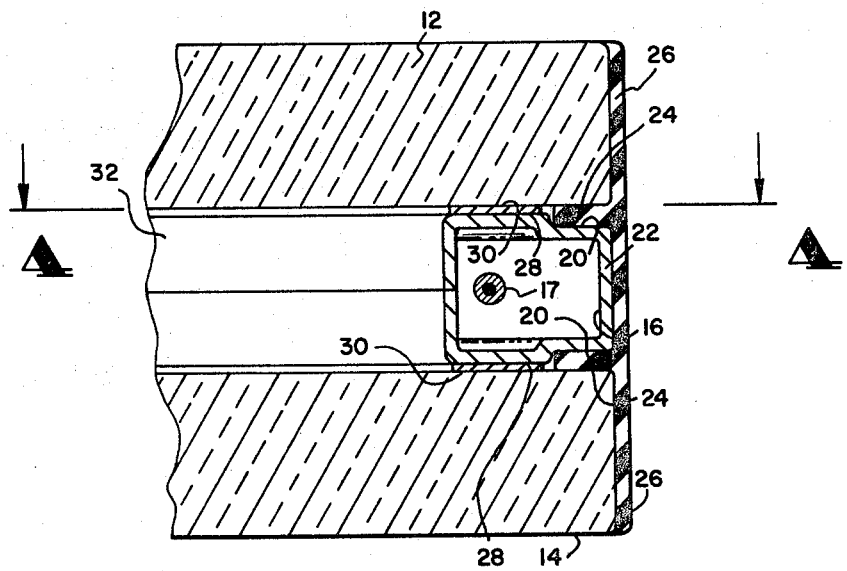
INVENTOR.
RICHARD R. THIEBEN
BY
Wm. H. Dean

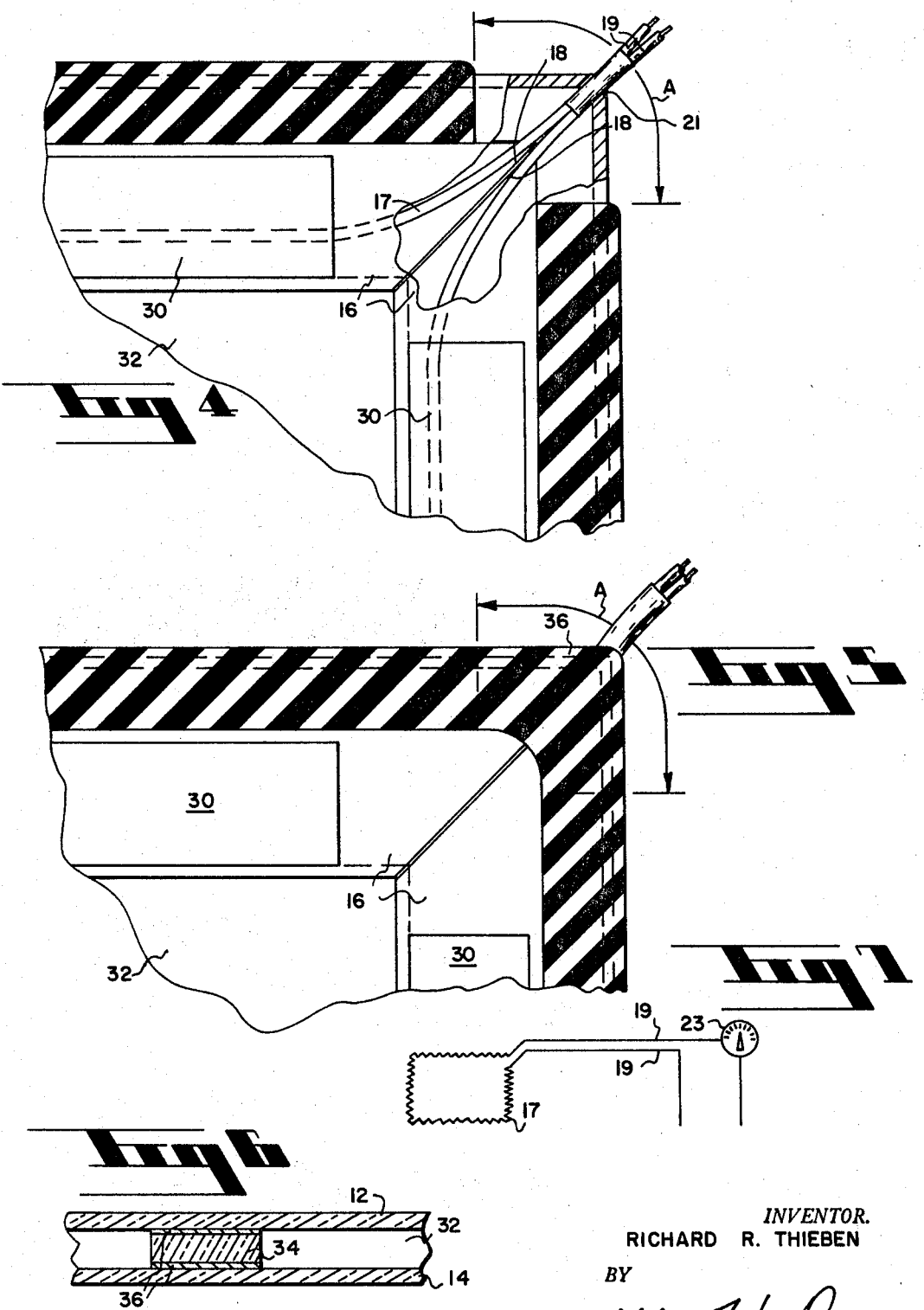

3,399,294
HEATED INSULATED GLASS WINDOW STRUCTURE
Richard R. Thieben, 5402 N. 64th Ave., Phoenix, Ariz. 85033
Filed Jan. 24, 1966, Ser. No. 537,581
4 Claims. (Cl. 219—522)

ABSTRACT OF THE DISCLOSURE

A heated insulated glass window structure having spaced apart panes hermetically sealed near their edges and held in spaced apart relation to each other by means of a hollow space element. An electric heating element internally of the hollow spacer element adapted to heat the panes and a space therebetween.

---

This invention relates to a heated insulated glass window structure.

In the prior art, various externally heated insulated glass window structures have been utilized, some of which employ spaced window panes having atmosphere therebetween which communicates with an expandable or contractable chamber externally of the space and the panes to compensate for variations of ambient pressures and temperatures.

Such prior art devices have also included various means for holding water collecting elements commonly known as descents. Many of the prior art structures permit atmosphere to escape from the space between the panes and return thereto and rely upon a descent material between the panes to collect moisture to prevent fogging of the inner surfaces of the spaces panes while the panes are externally heated to prevent fogging.

Accordingly, it is an object of the present invention to provide a novel hermetically sealed and internally heated and insulated glass structure provided with a pair of spaced panes between which a partial vacuum exists at high ambient pressures and wherein the atmosphere between the panes has a moisture content ranging below 15 percent relative humidity, whereby the expansion ratio of the heated atmosphere between the panes does not create undue internal pressure between the panes when the structure is moved to a relatively higher altitude and lower ambient pressure.

Another object of the invention is to provide a heated insulated glass window structure having a plurality of spaced apart panes between which is a hollow spacing element wherein an electrical heating element is disposed in the hollow spacer structure and hermetically sealed at the peripheral portions of the panes and the spacer structure, such that the heating element is disposed to heat said spacer which conductively heats a space between said panes, whereby condensation of moisture on the glass panes may be prevented.

Further objects and advantages of the invention may appear from the following specification, appended claims and accompanying drawings, in which:

FIG. 1 is a side elevational view of a window structure in accordance with the present invention;

FIG. 2 is an edge view of the structure shown in FIG. 1;

FIG. 3 is an enlarged fragmentary sectional view taken from the line 3—3 of FIG. 1;

FIG. 4 is a fragmentary sectional view taken from the line 4—4 of FIG. 3, showing a first step in sealing panes of a window structure of the invention together with a spacer;

FIG. 5 is a fragmentary sectional view similar to FIG. 4, but showing a final hermetic sealing step of the method of the invention to provide for hermetically sealing the air space between the panes of the structure to include an atmosphere having a partial vacuum at relatively high ambient pressures and to have a moisture content less than 15 percent relative humidity;

FIG. 6 is an enlarged fragmentary sectional view taken from the line 6—6 of FIG. 1; and FIG. 7 is a diagrammatic view of the electrical heating element and wiring in connection with the heated insulated glass window structure of the present invention.

In accordance with the present invention, the window structure, as shown in FIG. 1 of the drawings, may be a substantially rectangular assembly 10 and as shown in FIG. 2 of the drawings, this assembly 10 is composed of two glass panes 12 and 14 held in spaced relationship to each other by a substantially rectangular spacer element 16. This spacer element is shown in detail in FIGS. 3 and 4. The cross-sectional shape of the space element is substantially rectangular and this element is preferably made of heat conductive metal, such as aluminum or the like, or may be made of plastic or other materials. In a rectangular assembly, such as the assembly 10, the spacer element 16 may be made of four pieces which are provided with mitered end portions 18, as shown in FIG. 4 of the drawing, which fit together to form corner junctions.

As shown in FIGS. 3 and 4, of the drawings, a heating element 17 is disposed in a loop-shaped form in the spacer elements 16 which may be substantially rectangular in cross-section, as shown in FIG. 3 of the drawings. Coupled to opposite ends of this loop-shaped spacer elements are electrical conductors 19 which extend outwardly through an opening 21 at the mitered junctures of these spacer elements 16. As shown in FIG. 5 of the drawings, when the final application of sealing thiocol is applied at 36, it is also applied around the conductors 19 hermetically to seal therearound so that the space 32 inwardly of the spacer elements 16, as will be hereinafter described, will contain atmosphere of a partial vacuum relative to ambient atmosphere and a moisture content substantially low, as for example, below 15 percent relative humidity.

Operation of the heating element 17 may be varied as to heat input by a rheostat 23 which is coupled in circuit with the heating element 17 and conductors 19.

It will be understood to those skilled in the art that the spacer element 16 being a heat conducting element tend to conduct heat to the space 32 and to heat the glass panes 12 and 14 to prevent condensation of moisture thereon, such that the optical qualities of the window structure of the invention may be maintained under various atmospheric and temperature conditions.

The heating element 17, when energized, is of a capacity sufficient to operate at approximately 1.3 amps for each ten square feet of window area.

While the foregoing may be varied slightly, it represents a practical relationship between the area of the window structure of the invention and the amount of heat input sufficient maintain proper optical conditions of the window structure. In the cross-sectional shape of this spacer element, as shown in FIG. 3 of the drawings, step portions 20 near the outer edges 22 of these spacer elements, provide for the retention of sealing material at 24. This sealing material is preferably a thiocol compound and extends at 26 over the entire edge portions of the panes 12 and 14.

Extending outward toward the glass panes 12 and 14 and beyond the step portions 20 are glass supporting ledge portions 28 of the spacer elements. These ledge portions 28 are opposed and support transparent adhesive tape strips 30 which lie between the glass and the ledge portions 28 initially to secure the spacer elements between the panes of glass 12 and 14 during a time when the thiocol sealing compound is being cured around the peripheral edge portions of the glass panes and the spacer elements to seal the entire assembly with an air space 32 inwardly of the spacer elements and between the panes 12 and 14.

In accordance with the invention, this space 32 contains subatmospheric pressure or a partial vacuum and atmosphere having a relative humidity below 15 percent.

With such rarefied atmosphere in the space 32, the panes 12 and 14, under high ambient pressures and low ambient temperatures, tend to implode and particularly, when the panes 12 and 14 are relatively thin and of large cross-sectional area. Accordingly, in accordance with the present invention, grid spacer strips 34 are placed between the panes 12 and 14. These spacer strips 34, as shown in FIGS. 1 and 6, are of transparent material preferably glass and are initially held in place between the panes 12 and 14 by transparent adhesive strips 36 which are disposed between the grid spacer strips 34 and the panes 12 and 14. Thus, the spacer strips 34 tend to prevent implosion of the panes 12 and 14, all as will be hereinafter described in detail.

The thiocol sealing compound 20 is the reaction product of ethylene dichloride and a polysulfide of sodium and is a product which provides a very different sealant to surround the entire assembly 10 and to maintain a hermetic seal for the space 32. This thiocol compound may be heated and cured in accordance with the method of the present invention and yet remain substantially pliable for great periods of time.

In accordance with the method of the invention, the panes 12 and 14 are adhesively engaged with the strips 30 on the ledge portions 28 of the spacer elements 16 arranged in rectangular disposition, as shown in FIGS. 1, 2 and 4 of the drawings. The thiocol compound is intimately placed in the spaces at 24 between the spacer elements 16 and the adjacent surfaces of the panes 12 and 14 and at the corners, as shown in FIG. 4 of the drawings, the thiocol is omitted within the area indicated by the arrows A. The entire assembly is then placed in a heated room having a relative humidity of less than 15 percent and the atmosphere in the room may range at 150° F. or above. The thiocol is thus permitted to be treated for curing for a period of time which may be substantially eight hours or more. At this time, the space 32 has been heated such that the atmosphere therein has been expelled or removed to such an extent that when the space is related to ambient conditions and temperatures, it will constitute a partial vacuum when the areas A are sealed. Accordingly, the next step in the method is to place the thiocol in the corner areas at 36, such as to fill up the spaces A around the heating element conductors 19, it being necessary to perform this venting at only one of the corners and then subsequent sealing, as shown in FIG. 5 of the drawings. Thus, the thiocol is disposed to be open at one of the corners, as shown in FIG. 4 in the space A, and after initial heating and exhausting of the atmosphere in the space 32 commensurate with conditions of 150° F. and less than 15 percent relative humidity. The corner is sealed, as shown in FIG. 5, with the thiocol 36 in order to provide a hermetically sealed assembly 10. The assembly 10, as shown in FIG. 5, is maintained under the same temperature and atmospheric conditions for an additional period of time, such as eight hours or more. The assembly 10 being held at the temperature above 150° F. and in the same low humidity atmospheric condition, as for example, below 15 percent relative humidity. Thus, when the assembly 10 around the perimeter of the panes 12, conductor 19 and spacer 16 is hermetically sealed, the unit is then cooled to ambient temperatures whereupon a partial vacuum exists in the space 12 and the atmospheric moisture content is below 15 percent relative humidity. Accordingly, the gas in the space 32 weighs less than atmosphere of a comparable volume and having a relative humidity of 15 percent.

Thus, the density and the expansion ratio of the air is very low, such that it will not create undue internal pressure in the space when heated or when atmospheric temperatures or ambient temperatures are high. Under these conditions, the hermetically sealed unit 10 may be transported from a low altitude to a high altitude whereupon the low pressure in the space 32 combined with the low air density as occasioned by the low relative humidity of the atmosphere of the space 32 will not cause explosion of the assembly, particularly in the pane structures 12 and 14 when high ambient temperatures exist. As for example, the assembly 10 may be produced in accordance with the present method at around two thousand feet elevation and may be transported to an area at seven or eight thousand feet and subjected to the usual or existing high ambient temperatures which normally will tend to cause the atmosphere in the space 32 to expand. However, since this atmosphere is at a partial vacuum and low humidity, the relative expansion of the low humidity atmosphere combined with the low ambient pressure does not tend to cause explosion of the glass panes 12 and 14 outward. Conversely, when the assembly 10 is produced in accordance with the present method and shipped to sea level, the glass grid spacers 34 tend to prevent implosion. This is particularly important in large assemblies having large area due to the fact that the spacers 34 provide support for the panes 12 and 14 tending to implode at high ambient pressure and low ambient temperatures which may be encountered at sea level or low altitudes.

From the foregoing it will be apparent to those skilled in the art that the production of the internally heated assembly 10 and the hermetic sealing thereof, such that the assembly may be shipped from a production site to any normal altitude without explosion, when heated, or implosion at various ambient temperatures, offers many advantages heretofore unknown in the art. Accordingly, it will be apparent to those skilled in the art that the exhausting of atmosphere by a vacuum pumping method from the space 32 until a partial vacuum is created and until the relative humidity is below 15 percent, may be interpreted as coming within the scope of the invention, since the relative air density in the space 32 accounts for a low expansion ratio of the atmosphere therein as effected by elevated ambient temperatures, particularly at high altitudes and low ambient pressures, all of which tends to prevent explosion of the assembly 10 under these conditions. Further, it will be obvious that the sizing of the thickness of the panes, as well as the use of the spacer grid 34 will prevent implosion at high ambient pressures and low ambient temperatures. Further, it will be understood by those skilled in the art that the spacer grid elements 34 may not be needed in the assemblies 10 where the projected area of the panes is small. Accordingly, the sizing of the thickness of the glass relative to the cross-sectional area may be such that the panes tend to bow inward at high ambient pressures and low ambient temperatures, but do not touch each other and these panes may tend to bow outward away from each other at low ambient pressures and high ambient temperatures without reaching ultimate rupture stress due to the low expansion ratio of the low humidity atmosphere between the panes.

It will be apparent to those skilled in the art that an internally heated and insulated window glass structure, such as the assembly 10 produced in accordance with applicant's method, has many advantages over a vented pane assembly wherein a vent communicates between a space, such as the space 32 and outside atmosphere to equalize and accommodate changing ambient pressures and temperatures when the units are transported. These vented systems tend to accumulate humidity and moisture creating fogging problems and other effects which impair the optical qualities of the window assemblies. Thus, it will be apparent that applicant's method permits the production of the window assemblies in various areas and the shipment of such assemblies for use at various altitudes under varying atmospheric pressures and temperatures without the danger of explosion or implosion and the constant hermetically sealed condition of the heated space 32 insures excellent optical conditions of the assembly at all times.

It will be obvious to those skilled in the art that various modifications of the invention may be resorted to in a manner limited only by a just interpretation of the following claims.

I claim:

1. In a heated and insulated glass window structure the combination of: a pair of glass panes disposed in spaced relation to each other; a hollow heat conducting spacer element therebetween adjacent the peripheral portions of said panes; elastic cement coated on the peripheral edges of said panes and said spacer elements and hermetically sealing the adjacent portions of the panes and the spacer elements; an electrical resistance heating element in said hollow spacer element and communicating with a source of electrical energy externally of said panes; and a gas internally of said spacer element and between said panes, said gas having a weight per cubic measure less than ambient atmosphere when said atmosphere has less than 15 percent relative humidity, said atmosphere being in a condition of partial vacuum, said spacer element disposed to conduct heat to a space between said panes.

2. In a heated and insulated glass window structure, the combination of: a pair of glass panes disposed in spaced relation to each other; a spacer element therebetween adjacent peripheral portions of said panes; elastic cement coated on the peripheral edges of said panes and said spacer elements and hermetically sealing the adjacent portions of the panes and the spacer elements; and gas in said space inwardly of said spacer and between said panes, said gas being in a condition of partial vacuum and having a weight per cubic measure less than air having a relative humidity of less than 15 percent; and an electrical heating element disposed between said panes and inwardly of said elastic cement; conductors coupled to said electrical heating element and extending outwardly through said elastic cement and hermetically sealed thereby; said conductors disposed to be coupled to a source of electrical energy, said spacer element disposed to conduct heat to a space between said panes.

3. The invention, as defined in claim 2, wherein rheostat is coupled to said conductors in circuit with said heating element for varying the energy input thereto.

4. The invention, as defined in claim 2, wherein the sizing of the thickness of said panes relative to their projected areas being such that a partial vacuum between said panes causes them to be deflected inwardly toward each other at high ambient pressures and low ambient temperatures, but which does not deflect said panes into contact with each other at such high ambient pressure and low ambient temperatures and said sizing being such that said panes bow outward away from each other with reaching ultimate rupture stress conditions when subjected to low ambient pressures and heating and high ambient temperatures due to the low expansion ratio of the low humidity atmosphere between said panes.

References Cited
UNITED STATES PATENTS

| | | | |
|---|---|---|---|
| 1,891,128 | 12/1932 | Watlington | 219—522 X |
| 2,022,296 | 11/1935 | Mills | 52—171 |
| 2,513,993 | 7/1950 | Burton | 52—171 X |
| 3,183,560 | 5/1965 | Brichard | 20—56.5 |
| 3,192,575 | 7/1965 | Rosenau et al. | 20—56.5 |

BERNARD A. GILHEANY, *Primary Examiner.*

VOLODYMYR Y. MAYEWSKY, *Assistant Examiner.*